(12) United States Patent
Holz et al.

(10) Patent No.: US 10,049,287 B2
(45) Date of Patent: Aug. 14, 2018

(54) COMPUTERIZED SYSTEM AND METHOD FOR DETERMINING AUTHENTICITY OF USERS VIA FACIAL RECOGNITION

(71) Applicant: OATH INC., New York, NY (US)

(72) Inventors: Christian Holz, San Francisco, CA (US); Miteshkumar Patel, San Jose, CA (US); Senaka Wimal Buthpitiya, Mountain View, CA (US)

(73) Assignee: OATH INC., New York, NY (US)

( * ) Notice: Subject to any disclaimer, the term of this patent is extended or adjusted under 35 U.S.C. 154(b) by 0 days.

(21) Appl. No.: 14/719,654

(22) Filed: May 22, 2015

(65) Prior Publication Data

US 2016/0342851 A1 Nov. 24, 2016

(51) Int. Cl.
*G06K 9/00* (2006.01)

(52) U.S. Cl.
CPC ..... *G06K 9/00906* (2013.01); *G06K 9/00288* (2013.01); *G06K 9/00892* (2013.01)

(58) Field of Classification Search
CPC ............... G06K 9/00899; G06K 9/00906
USPC .......................................................... 382/118
See application file for complete search history.

(56) References Cited

U.S. PATENT DOCUMENTS

| | | | | |
|---|---|---|---|---|
| 5,719,950 | A * | 2/1998 | Osten | A61B 5/0205 340/5.82 |
| 7,536,037 | B2 * | 5/2009 | Sung | G06K 9/00255 250/339.11 |
| 8,457,367 | B1 * | 6/2013 | Sipe | G06K 9/00221 382/118 |
| 8,675,926 | B2 * | 3/2014 | Zhang | G06K 9/00906 382/118 |
| 9,251,427 | B1 * | 2/2016 | Chu | G06K 9/00221 |
| 2006/0034493 | A1 * | 2/2006 | Shimamura | A61B 5/1172 382/115 |
| 2012/0075452 | A1 * | 3/2012 | Ferren | G02B 13/0065 348/78 |
| 2014/0071293 | A1 * | 3/2014 | Unnikrishnan | G06K 9/00221 348/164 |

(Continued)

OTHER PUBLICATIONS

Wu et al. Eulerian Video Magnificaiton for Revealing Subtle Changes in the World, ACM Transactions on Graphics, vol. 31, No. 4, 2012.*

*Primary Examiner* — John Strege
(74) *Attorney, Agent, or Firm* — James J. DeCarlo; Greenberg Traurig, LLP

(57) ABSTRACT

Disclosed are systems and methods for improving interactions with and between computers in an authentication system supported by or configured with authentication servers or platforms. The systems interact to identify access and retrieve data across platforms, which data can be used to improve the quality of results data used in processing interactions between or among processors in such systems. The disclosed anti-spoofing systems and methods provide improved functionality to facial recognition systems by enabling enhanced "spoof" (or attempts to impersonate a user) detection while authenticating a user. The disclosed systems and method provide additional functionality to existing facial recognition systems that enables such systems to actually determine whether the image being captured and/or recorded is that of an actual person, as opposed to a non-human representation.

20 Claims, 7 Drawing Sheets

(56) References Cited

U.S. PATENT DOCUMENTS

| | | | | |
|---|---|---|---|---|
| 2015/0227781 A1* | 8/2015 | Morishita | ............ | G06K 9/00899 |
| | | | | 382/118 |
| 2015/0324629 A1* | 11/2015 | Kim | .................... | G06K 9/00228 |
| | | | | 382/203 |
| 2015/0379332 A1* | 12/2015 | Matsunaga | ........ | G06K 9/00315 |
| | | | | 348/77 |

* cited by examiner

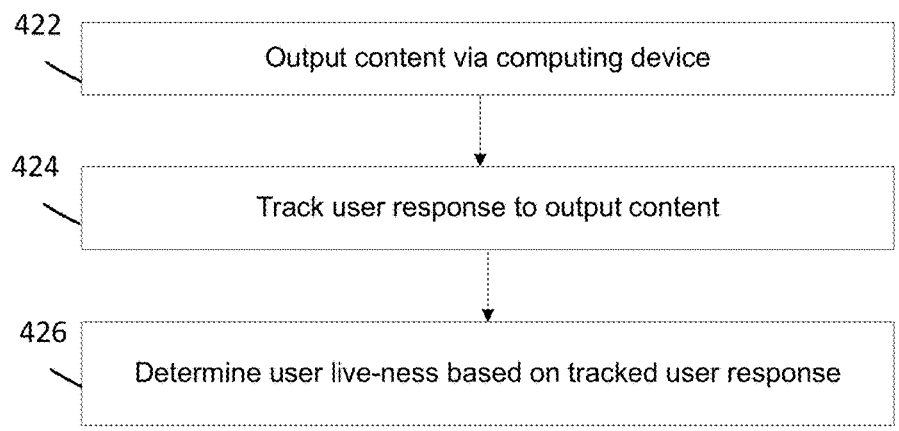
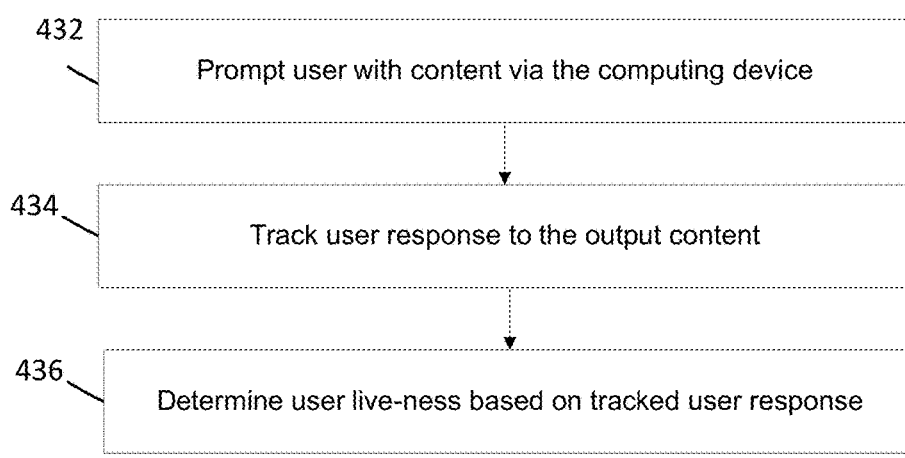

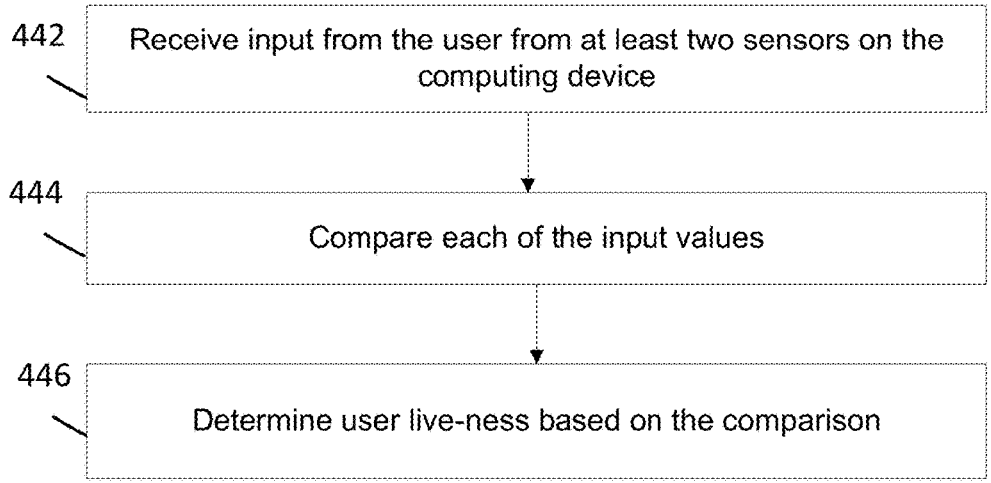
FIG. 4E     440

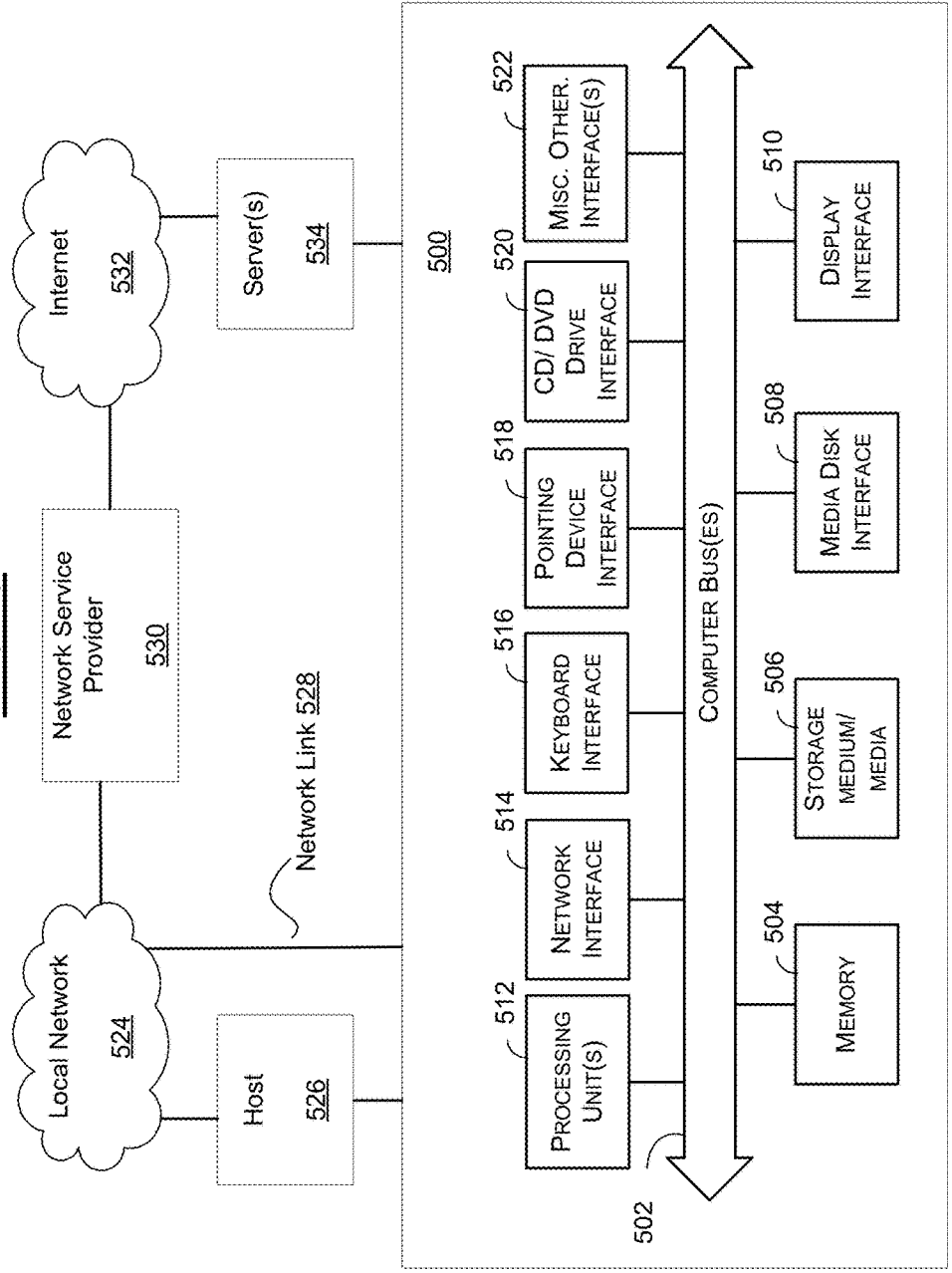

COMPUTERIZED SYSTEM AND METHOD FOR DETERMINING AUTHENTICITY OF USERS VIA FACIAL RECOGNITION

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to authentication systems and/or platforms performing facial recognition, and more particularly, to systems and methods for determining the authenticity of a user via facial and/or iris recognition of the user.

BACKGROUND

Conventional systems enable users to activate or otherwise gain access to functionalities controlled by a computing device by "unlocking" the device. As understood by those of skill in the art, a computing device may be configured to "unlock" in response to receiving some type of authentication information provided by the user. Such authentication information may take various forms, including, but not limited to, alphanumeric passcodes and biometric information including, but not limited to fingerprints, retina scans, and facial images.

SUMMARY

In general, the present disclosure describes improved computer systems and methods for authorizing a user's access to a computer and/or computer system via facial image input using facial recognition technology. Specifically, the present disclosure provides anti-spoofing systems and methods for determining the "live-ness", or the actual presence of a user that is being recorded or captured by a type of facial recognition technology (e.g., camera). "Live-ness," as discussed herein, refers to the image being recorded or captured by the camera actually being a representation of a human being, and not a digital rendering or other type of fake representation of the human being. The disclosure herein provides functionality for improving the operation of a computer system through enhanced security functions, and among other features is directed to addressing security issues in the field of data protection The disclosed anti-spoofing systems and methods provide improved functionality to facial recognition systems by enabling enhanced "spoof" (or attempts to impersonate a user) detection. For example, simple spoofing methods include a printout of a registered person's face, which an attacker can simply hold in front of the camera. More advanced spoofs involve a headshot attached to an attacker's face to demonstrate head motion. With the advancement in depth sensing technologies and cost effectiveness of manufacturing three-dimensional (3D) faces, spoof attacks can also be carried out by attackers using 3D faces. With easy access to video content through various social networking and video hosting websites, spoofing using pre-recorded videos is a viable technique used by attackers.

Conventional attempts to remedy such spoof attacks by detecting users' lip motions and eye blinking have fallen short as lip and/or eye movement detection can be easily reproduced and therefore spoofed. For example, through producing motion around a printout's eye to simulate a blink to the camera, or by showing a recorded video of a registered user to the camera to demonstrate lip motion.

The disclosed systems and method provide additional functionality to existing facial recognition systems that enables such systems to actually determine whether the image being captured and/or recorded is that of an actual person, as opposed to a non-human representation. According to some embodiments, the disclosed systems and methods provide a variety of classes of approaches for determining live-ness and the actual presence of a user during facial authentication that can operate jointly and severally.

According to some embodiments, the disclosed systems and methods can detect autonomous activities, including, but not limited to, pulse detection and/or blood circulation from a user's face, and/or by tracking subtle head movements of the user.

According to some embodiments, the disclosed systems and methods can also implicitly (i.e., without a user's knowledge) trigger a user for inadvertent responses, including, but not limited to, tracking the user's small eye movements (e.g., saccades) when displaying and moving objects on the screen. The disclosed systems and methods can also perform the following non-limiting determinations: check for reflections of the screen in the user's pupils, provoke squinting from the user by showing blurred images which can provoke such squinting, track micro-expressions from the user in order to identify signs of recognition in response to displaying random sequences of known and unknown people, display an avatar with random expressions and checking for reciprocal micro-expressions, produce loud sounds and detect a response (such as cringing), and the like. In response to such triggers being presented to the user, the disclosed systems and methods can determine the authenticity and/or live-ness of the image being recorded/captured during and/or immediately in response to presentation of such triggers.

According to some embodiments, the disclosed systems and methods can also explicitly (i.e., with a user's knowledge) trigger a user for a response that indicates that the image being captured/recorded of the user is an actual human being. By way of non-limiting example, the disclosed systems and methods can prompt the user to read out a dynamically generated phrase while performing lip recognition to determine if the lip movement matches the requested phrase. In another non-limiting example, the disclosed systems and methods can prompt a user to perform a series of randomized actions (e.g., turning the head), ask the user to follow, with their eyes, an object moving on the screen, and the like, whereby the detection of such movements is matched to the requested action to determine if the actions match the requested actions.

According to some embodiments, the disclosed systems and methods can correlate features extracted from a user-facing camera with features extracted from a back-facing camera on mobile devices. By way of a non-limiting example, the disclosed systems and methods can perform a matching of the pulse rate detected in the user's face with the pulse rate detected from the user's finger when placed on the back-facing camera of a mobile device. Each of the above discussed embodiments can be implemented as a stand-alone embodiment or as a combination of embodiments in conjunction with or in addition to existing facial recognition technology. The present disclosure provides increased security and accuracy of facial recognition authentication systems through implementation of the disclosed anti-spoofing systems and methods.

In accordance with one or more embodiments, a method is disclosed which includes capturing, via a computing device, a representation of a user, said representation comprising a rendering of a face of the user; parsing, via the computing device, said captured representation to identify facial features of the user, said parsing comprising determining information associated with a human being based on the identified facial features; determining, via the computing device, a live-ness of the captured representation based on the determined information, said live-ness indicating that the representation is of a human being and not a non-human representation; and enabling, via the computing device, facial recognition authentication of the user based on said live-ness determination.

According to some embodiments of the present disclosure, the method further includes analyzing said captured representation to identify an activity associated with at least one of said facial features; and identifying variations in at least one of said facial features as performing an autonomous activity.

According to some embodiments, the method can further includes determining a pulse from the captured image by amplifying said identified variations, wherein said pulse determination triggers said live-ness determination. According to some embodiments, the method can further include detecting temporal color changes in the user's face based on said identified variations; and determining blood circulation from said captured image based on said detected color changes, wherein said blood circulation determination triggers said live-ness determination.

According to some embodiments, the method can further include receiving an input from the user, said input comprising a second pulse reading derived from a finger of the user being placed a camera of the computing device; comparing a pulse pattern of the pulse determined from the captured image and a pulse pattern of the second pulse; and determining said live-ness of the user based on said comparison, wherein said comparison satisfying a threshold triggers said live-ness determination.

According to some embodiments of the present disclosure, the method further includes analyzing said facial features to identify movements of at least one of said facial features; and detecting non-linear movements of said at least one of said facial features, wherein said non-linear movement detection triggers said live-ness determination.

According to some embodiments of the present disclosure, the method further includes generating an output to be rendered to the user, said output comprising information indicating a predetermined user response to the output; tracking a response by the user to said output; and determining said live-ness of the user based on said user response, said determination comprising comparing said predetermined user response to said user response, wherein said comparison satisfying a threshold triggers said live-ness determination. According to some embodiments, the output comprises a stimulus (or stimuli) that prompts the user with said output, said prompt comprising requesting said user to respond to said output.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for determining the authenticity of a user via facial and/or iris recognition of the user.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIGS. 4A-4E are flowcharts illustrating steps performed in accordance with some embodiments of the present disclosure; and FIG. 5 is a block diagram illustrating architecture of a hardware device in accordance with one or more embodiments of the present disclosure.

DESCRIPTION OF EMBODIMENTS

Figure 1:
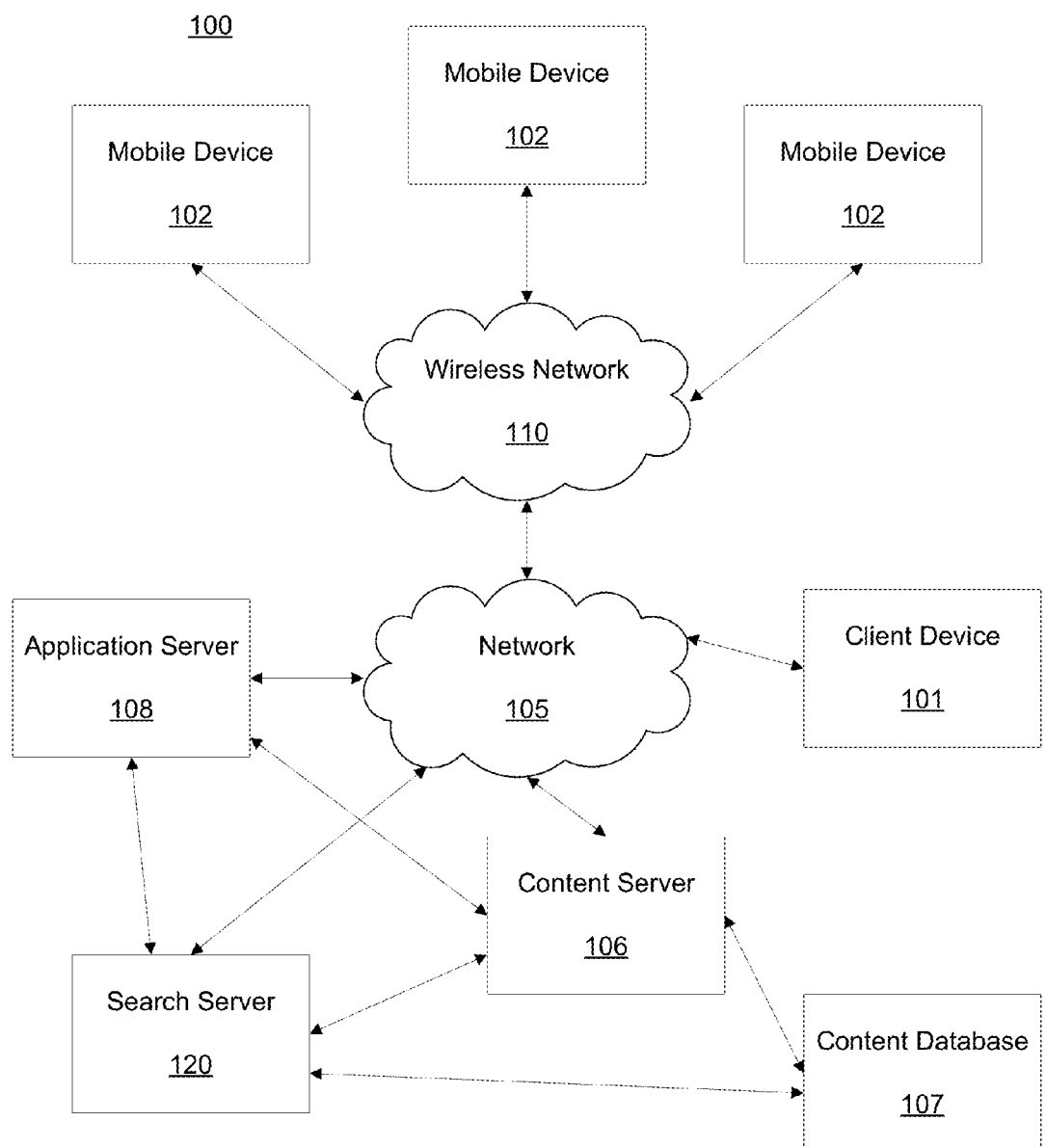
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer to alter its function, a special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, an integrated or distributed device combining various features, such as features of the forgoing devices, or the like.

A client device may vary in terms of capabilities or features. Claimed subject matter is intended to cover a wide range of potential variations. For example, a smart phone, phablet or tablet may include a numeric keypad or a display of limited functionality, such as a monochrome liquid crystal display (LCD) for displaying text. In contrast, however, as another example, a web-enabled client device may include one or more physical or virtual keyboards, mass storage, global positioning system (GPS) or other location-identifying type capability, or a display with a high degree of functionality, such as a touch-sensitive color 2D or 3D display, for example. A client device, as discussed herein, can also include one or more accelerometers and/or one or more gyroscopes.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn® , Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. By way of background, conventional face and iris recognition systems provide ways for biometric user authentication, require no specialized hardware components, and can be implemented on any type of commodity devices (e.g., mobile devices, personal computers, tablets, phablets, wearable computers, laptops, and the like). Such devices use a built-in camera to record the face of the user and/or the user's iris, extract features, calculate metrics and verify whether or not the user is registered with the system. Attempts to robustly identify users based on these features have become ubiquitous in today's technological environment. For example, conventional commercial systems can implement blink detection and detection of noticeable head and lip motion for face recognition.

Unfortunately, such systems can be easily spoofed. For example, simple spoofing methods include a printout of a registered person's face, which an attacker simply holds up in front of the camera. More advanced spoofs involve a headshot attached to an attacker's face to demonstrate head motion. With the advancement in depth sensing technologies and cost effectiveness of manufacturing three-dimensional (3D) faces, spoof attacks are also carried out by attackers using 3D faces. With easy access to video content through various social networking and video hosting websites, spoofing using pre-recorded videos is a viable technique used by attackers. Furthermore, attempts to remedy such spoof attacks by detecting users' lip motions and eye blinking have fallen short as lip and/or eye movement detection can be easily reproduced and therefore spoofed. For example, through producing motion around a printout's eye to simulate a blink to the camera, or by showing a recorded video of a registered user to the camera to demonstrate lip motion.

The present disclosure remedies the shortcomings in the art by providing anti-spoofing systems and methods that determine the "live-ness" of a user, or that the image being recorded or captured by the camera of the device performing the authentication is actually that of a human being, and not a digital rendering or other type of fake representation of the user. That is, the disclosed systems and methods solve problems of detecting spoof attacks for image-based biometric authentication systems and methods including face and iris detection. Existing implementations simply check the activity of an image being captured, such as head or lip motion, or eye blinking, all of which can be spoofed with minimal effort.

The disclosed systems and methods for determining and verifying live-ness ensure that the authenticity of the images recorded by a facial recognition system actually represent a human being. As discussed in more detail below, the disclosed anti-spoofing systems and methods provide improved functionality to facial recognition systems by enabling enhanced "spoof" (or attempts to impersonate a user) detection while authenticating a user.

For example, the disclosed systems and methods can, according to embodiments of the present disclosure, detect inadvertent actions and reactions of a user in order to establish live-ness and physical presence of a face captured by the camera. Thus, as discussed in more detail below, the disclosed systems and method provide additional functionality to existing facial recognition systems that enables such systems to actually determine whether the image being captured and/or recorded is that of an actual person (e.g., the user's face), as opposed to a non-human representation. According to some embodiments, reference to capturing a user's face can include capturing of the face as a whole, including, but not limited to, all or a subset of the other features of the face, such as, for example, the outline of the face, user's eyes, irises, features of the iris, eyebrows, lips, nose, ears, hair, brow, and the like.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")-network 105, wireless network 110, mobile devices (client devices) 102 and client device 101. FIG. 1 additionally includes a variety of servers, such as content server 106, application (or "App") server 108, and search server 120.

One embodiment of mobile devices 102 is described in more detail below. Generally, however, mobile devices 102 may include virtually any portable computing device capable of receiving and sending a message over a network, such as network 105, wireless network 110, or the like. Mobile devices 102 may also be described generally as client devices that are configured to be portable. Thus, mobile devices 102 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, tablet computers, phablets, integrated devices combining one or more of the preceding devices, and the like. As such, mobile devices 102 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102 may uniquely identify themselves through any of a variety of mechanisms, including a phone number, Mobile Identification Number (MIN), an electronic serial number (ESN), or other mobile device identifier.

In some embodiments, mobile devices 102 may also communicate with non-mobile client devices, such as client device 101, or the like. In one embodiment, such communications may include sending and/or receiving messages, searching for and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-102 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102 and its components with network 105. Wireless network 110 may include any of a variety of wireless sub-networks that may further overlay stand-alone ad-hoc networks, and the like, to provide an infrastructure-oriented connection for mobile devices 102. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly. Wireless network 110 may further employ a plurality of access technologies including, but not limited to, 2nd (2G), 3rd (3G), and/or 4th (4G) generation radio access for cellular systems (and/or other advances in such technology including, for example, $5^{th}$ (5G) generation radio access), WLAN, Wireless Router (WR) mesh, and the like. Access technologies such as 2G, 3G, 4G and future access networks may enable wide area coverage for mobile devices, such as mobile devices 102 with various degrees of mobility. For example, wireless network 110 may enable a radio connection through a radio network access such as Global System for Mobil communication (GSM), General Packet Radio Services (GPRS), Enhanced Data GSM Environment (EDGE), LTE, Wideband Code Division Multiple Access (WCDMA), and the like. In essence, wireless network 110 may include virtually any wireless communication mechanism by which information may travel between mobile device 102 and another computing device, network, and the like.

Network 105 is configured to couple content server 106, application server 108, or the like, with other computing devices, including, client device 101, and through wireless network 110 to mobile devices 102. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between content servers 106, application server 108, client device 101, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within an electronic social networking site. A social network refers generally to an electronic network of individuals, such as acquaintances, friends, family, colleagues, or co-workers, coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, such as an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, authentication services and/or identity verification services, as well as, search services, email services, photo services, web services, third-party services, audio services, video services, instant messaging (IM) services, SMS services, MMS services, FTP services, voice over IP (VOIP) services, or the like. Such services, for example a search engine and/or search platform, can be provided via the search server 120, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

Servers 106, 108, 120 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108 and/or 120. This may include in a non-limiting example, authentication servers, verification servers, search servers, email servers, social networking services servers, SMS servers, IM servers, MMS servers, exchange servers, photo-sharing services servers, and travel services servers, via the network 105 using their various devices 101-102. In some embodiments, applications, such as a search application (e.g., Yahoo! Search®, and the like), can be hosted by the application server 108 (or search server 120). Thus, the application server 108 can store various types of applications and application related information including application data and user profile information (e.g., identifying information associated with a user that requires authentication prior to the user being able to access such data/services). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein.

Moreover, although FIG. 1 illustrates servers 106, 108 and 120 as single computing devices, respectively, the disclosure is not so limited. For example, one or more functions of servers 106, 108 and/or 120 may be distributed across one or more distinct computing devices. Moreover, in one embodiment, servers 106, 108 and/or 120 may be integrated into a single computing device, without departing from the scope of the present disclosure.

Figure 2:
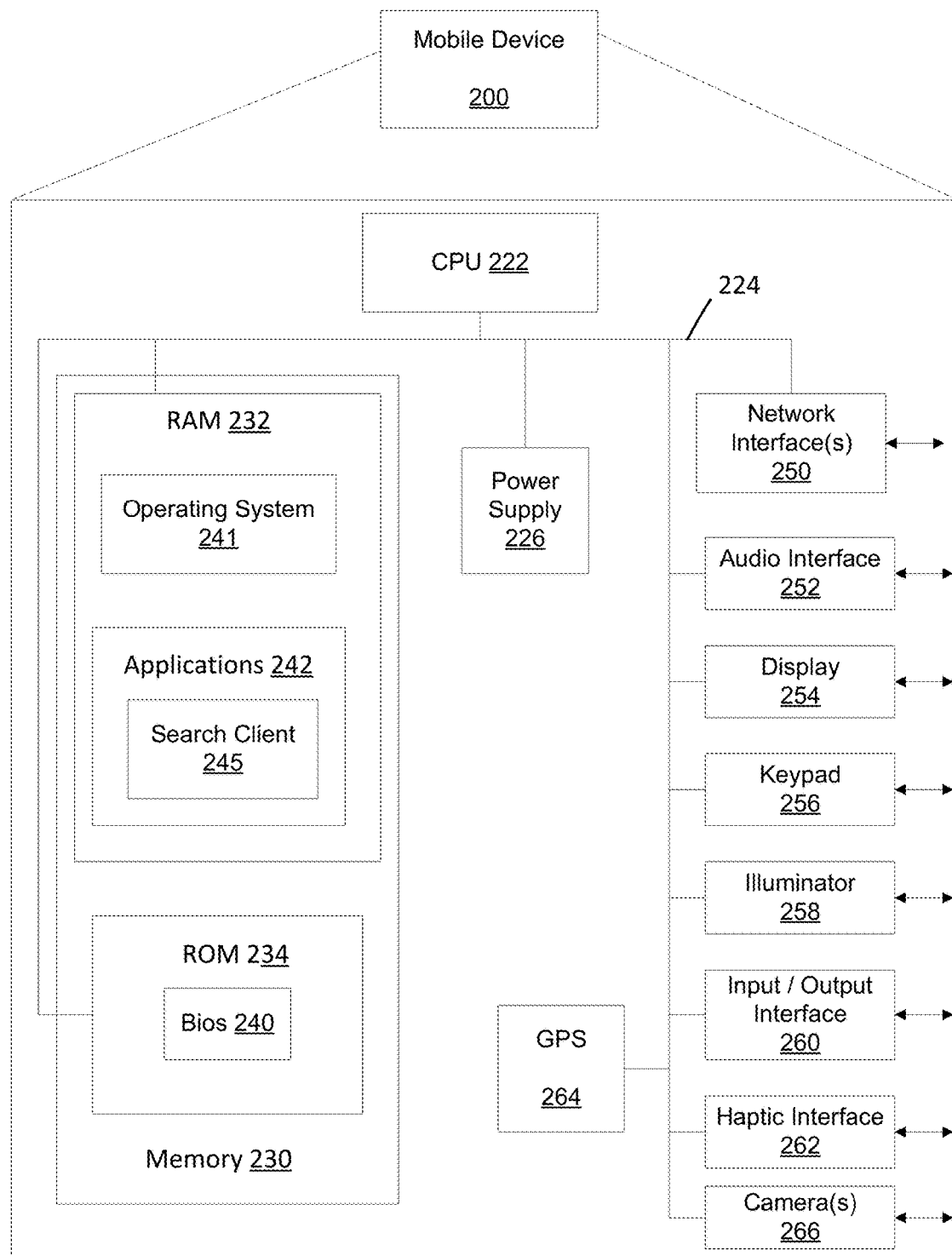
FIG. 2 depicts is a schematic diagram illustrating a client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) 266. Device 200 can include one camera 266, or a plurality of cameras 266, as understood by those of skill in the art. The positioning of the camera(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies including, but not limited to, LTE, global system for Client communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 300.

Applications 242 may include computer executable instructions which, when executed by Client device 200, transmit, receive, and/or otherwise process audio, video, images, and enable telecommunication with another user of another client device. Other examples of application programs include calendars, browsers, contact managers, task managers, transcoders, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query messages, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described.

Figure 3:
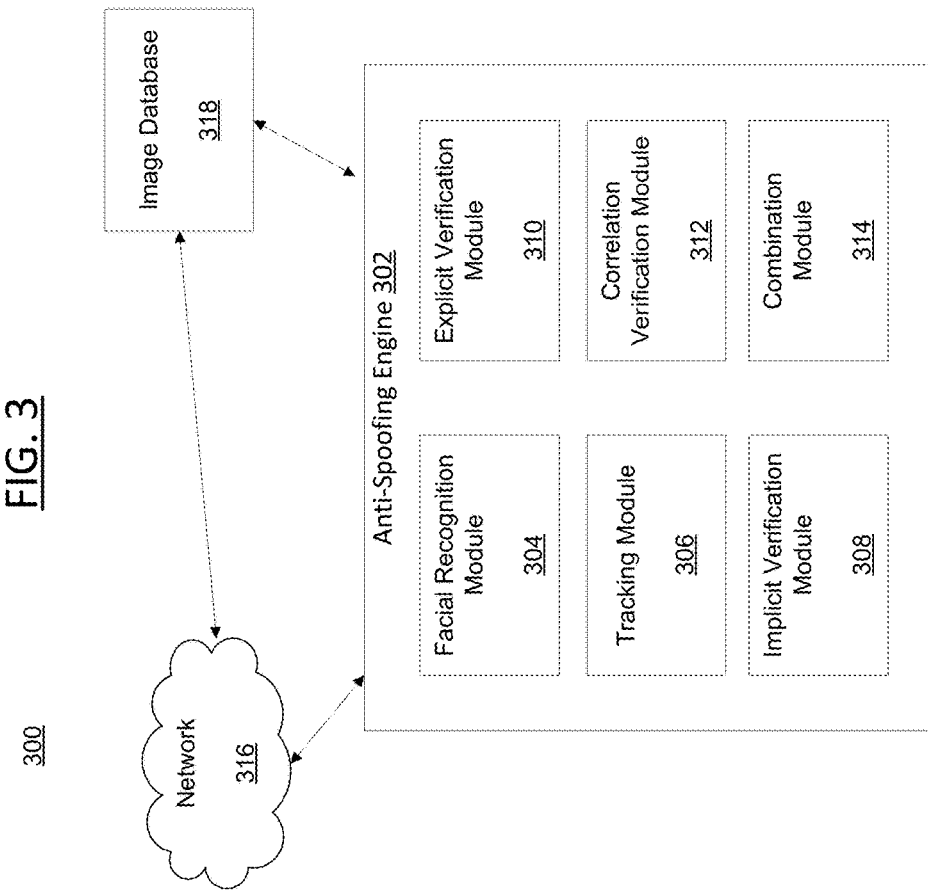
FIG. 3 is a schematic block diagram illustrating components of a system in accordance with embodiments of the present disclosure.

FIG. 3 is a block diagram illustrating the components of system 300 for performing the systems and methods discussed herein. System 300 includes an anti-spoofing engine 302, network 316 and database 318. According to embodiments of the present disclosure, the anti-spoofing engine 302 is a special purpose machine or processor and could be hosted by a computing device, such as, but not limited to, a web server, application server, search server, content provider, email service provider, ad server, user's computing device, or any combination thereof. The database 318 can be any type of database or memory modified to perform as described herein, and can be associated with the anti-spoofing engine 302 and/or a hosting device, such as, for example, content server 106 or application server 108. The database 318 can store user information including, but not limited to, user identifying information, user demographic information, and user biometric information, and the like.

For example, user biometric information can include, but is not limited to, fingerprints, retina scans, and facial images and the like. Indeed, such information can include further information corresponding to such imagery or readings produced from any type of known or to be known facial recognition system, such as, but not limited to, the color of the user's face (e.g., skin tone), salient frequency of the color changes to a user's face during and/or between facial readings, the user's determined pulse, iris color, pupil dilation, corneal and pupil reflection relationship, highlights from blurred and/or un-blurred portions of the eye, and/or any other type of Purkinje information, and the like. Thus, it should be understood that the data (and metadata) in the database 318 can be any type of information associated with determining a user's identity, whether known or to be known, without departing from the scope of the present disclosure.

As discussed above, with reference to FIG. 1, the network 316 can be any type of network such as, but not limited to, a wireless network, a local area network (LAN), wide area network (WAN), the Internet, or a combination thereof. The network 316 facilitates connectivity between the anti-spoofing engine 302 and the database of stored resources 318. Indeed, as illustrated in FIG. 3, the anti-spoofing engine 302 and database 318 can be directly connected by any known or to be known method of connecting and/or enabling communication between such devices and resources.

The principal processor, server, or combination of devices that comprises hardware programmed in accordance with the special purpose functions herein, referred to for convenience as anti-spoofing engine 302, includes a facial recognition module 304, tracking module 306, implicit verification module 308, explicit verification module 310, correlation verification module 312 and combination module 314. It should be understood that the engine(s) and modules discussed herein are non-exhaustive, as additional or fewer engines and/or modules may be applicable to the embodiments of the systems and methods discussed. The operations, configurations and functionalities of each module of the anti-spoofing engine 302, and their role within embodiments of the present disclosure will be discussed with reference to FIGS. 4A-4E.

Figure 4A:
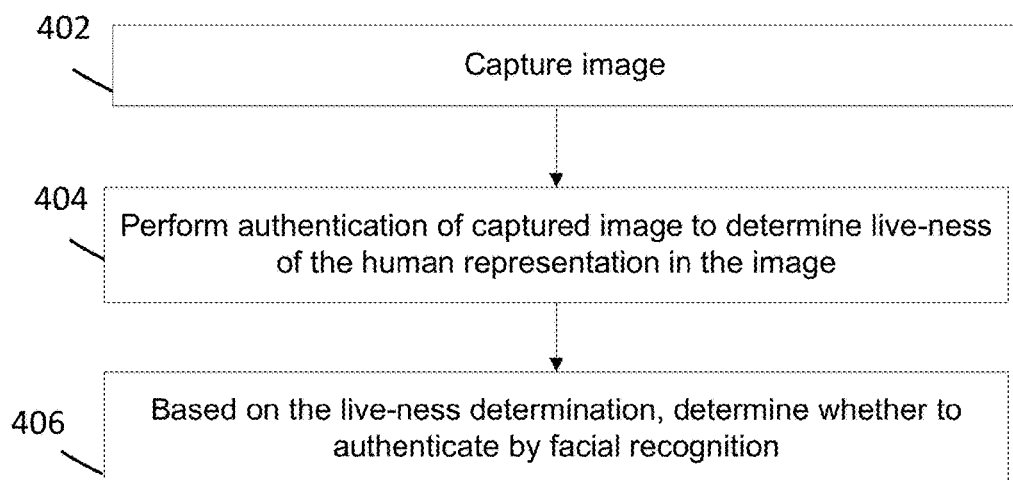
Figure 4B:
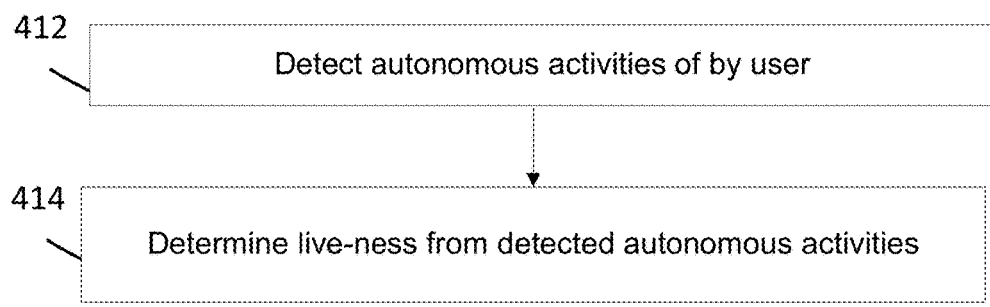

Turning now to FIGS. 4A-4E, the present disclosure provides the disclosed systems and methods for determining live-ness of a recorded/captured image. That is, FIG. 4A discloses steps for determining, during or upon using any type of known or to be known facial and/or iris recognition technology, whether the image being captured and/or recorded is that of an actual person, as opposed to a non-human representation. FIG. 4B, according to some embodiments, discloses systems and methods for detecting autonomous activities, including, but not limited to, pulse detection and/or blood circulation from a user's face, and/or by tracking subtle head movements of the user.

Discussed in more detail below, FIG. 4C, according to some embodiments, discloses steps for implicitly (i.e., without a user's knowledge) triggering a user for inadvertent responses, including, but not limited to, tracking the user's small eye movements (e.g., saccades) when displaying and moving objects on the screen. FIG. 4D, according to some embodiments, discloses steps for explicitly (i.e., with a user's knowledge) triggering or prompting a user for a response that indicates that the image being captured/recorded of the user is an actual human being. FIG. 4E, according to some embodiments, discloses steps for correlating features extracted from a user-facing camera with features extracted from a back-facing camera on mobile devices.

Additionally, according to some embodiments, the disclosed systems and methods discussed herein can involve a combination of all, to at least two (2) of the processes from FIGS. 4B-4E. Thus, a variety of techniques and/or combination of techniques can be implemented to ensure the live-ness of a user requesting access to a device/application/service.

According to some embodiments, the disclosed steps performed in association with FIGS. 4A-4E may be performed prior to, during or immediately after, or some combination thereof, the implementation or execution of a type of facial recognition system. As discussed herein, facial recognition systems are to be understood to include any type of known or to be known facial and/or iris recognition and/or authentication system, as understood by those of ordinary skill in the art. The disclosed systems and methods can utilize any known or to be known facial recognition system, via the facial recognition module 304, to verify a person from a digital image or a video frame(s) from a video source.

Such systems can include, but are not limited to, geometric algorithms, photometric algorithms, three-dimensional (3D) algorithms and/or skin-texture algorithms. For example, such algorithms can include, but are not limited to, principal component analysis using Eigen-faces, linear discriminate analysis, elastic bunch graph matching using the Fisherface algorithm, a Hidden Markov model, the Multilinear Subspace Learning using tensor representation, a neuronal motivated dynamic link matching, and the like, in addition to any other type of authentication and/or verification system utilizing a user's biometric reading to verify the user's identity.

Turning now to FIG. 4A, FIG. 4A is a Process 400 diagram illustrating steps performed in accordance with embodiments of the present disclosure for determining and verifying that the images recorded by a facial recognition system actually represent a human being. Process 400 is performed by the anti-spoofing engine 302, which enables the anti-spoofing steps discussed herein. FIG. 4A begins with Step 402 where a computing device, having at least one camera, captures an image. In some embodiments, Step 402 can involve capturing a recording of an image. Thus, the captured image can be a static image rendering or a video recording of sequential image frames (i.e., video frames). Step 402 can optionally include, as understood by those of skill in the art, the computing device emitting a light beam, which as a non-limiting example can be a flash emitted by a flashbulb of, or coupled to, the computing device. Thus, in response to the light emission, Step 402 involves the capturing an image of a face.

Step 402 can include, as understood by those of skill in the art, identification of a face, facial features, and/or head of a user within the captured image, as discussed in more detail below. For example, Step 402 can involve identifying the location of at least one eye, a mouth, nose, hair, ears, eyebrows, outline of the head, and the like, from within the captured image. As discussed above, the captured image maybe an image, a series of images, or a video recording, and can additionally be used for authentication by a facial recognition system (by the facial recognition module 304).

In Step 404, the anti-spoofing engine 302 then performs authentication of the captured image to determine the live-ness of the human representation in the captured image. The details of Step 404 are discussed in more detail in relation to the below discussion of FIGS. 4B-4E (and processes 410-440, respectively). According to some embodiments, Step 404 can involve parsing the captured image to identify biometric information associated with a user (or human being).

According to some embodiments, Step 406 can include a determination as to whether the captured image is a representation of a human face. If not, then Process 400 would end. Such determination, can include, but is not limited to, identifying at least one known facial characteristic shared by all humans. For example, an eye in the captured image from Step 402 can be identified, whereby a detection as whether the identified eye includes a reflection of light from the cornea. In another example, the determination in Step 406 can include measuring glare or pigment in a user's skin and/or lips. It should be understood that any known or to be known determination for identifying whether the captured image includes a rendering of a user's face may be used herein.

In Step 406, the anti-spoofing engine 302 determines whether to attempt to authenticate a user by facial recognition based on the live-ness determination of Step 404. That is, if the computing device does not determine that the captured image is that of a human being (from FIGS. 4B-4E), then the computing device executing the anti-spoofing engine 302 may not run one or more facial recognition programs on the captured facial image. However, if there is a successful determination from Step 404 (i.e., FIGS. 4B-4E) that the captured image represents an actual human being, then the computing device may run one or more facial recognition programs on the captured facial image in order to authenticate the user (e.g., allow access to the device and/or program subject to an access request).

Turning now to FIGS. 4B-4E, processes 410-440, respectively, disclose anti-spoofing systems and methods which provide improved functionality to facial recognition systems by enabling enhanced "spoof" (or attempts to impersonate a user) detection in advance of, or during the verification of a user's identity. As discussed in more detail below, the disclosed systems and methods, according to embodiments of the present disclosure, can detect inadvertent actions and reactions of a user in order to establish live-ness and physical presence of a face captured by the camera. Thus, as discussed in more detail below, the disclosed systems and method provide additional functionality to existing facial recognition systems that enables such systems to actually determine whether the image being captured and/or recorded is that of an actual person (e.g., the user's face), as opposed to a non-human representation.

FIG. 4B is a Process 410 diagram illustrating steps performed in accordance with embodiments of the present disclosure for detecting autonomous activities, including, but not limited to, pulse detection and/or blood circulation from a user's face, and/or by tracking subtle head movements of the user. The steps of Process 410 are performed by the tracking module 306 of the anti-spoofing engine 302.

Process 410 begins with Step 412, which is performed after capturing the image in Step 402 in Step 4A. Step 412 involves the detection of autonomous activities from the captured image. As discussed herein, the detection of autonomous activities performed in Step 412 can include, but is not limited to, the detection of a pulse from the captured image, the detection of blood circulation in the user's face from the captured image, and the detection of subtle and/or involuntary movements of the head (or portions of the head), or some combination thereof According to some embodiments, Step 412 involves the application of a magnification algorithm to the captured image. Process 410 can implement any known or to be known magnification algorithm to perform electronic image processing to identify the colors, contrast, and/or tracking of characteristics from the captured image. By way of a non-limiting example, Process 410 can implement an Eulerian video magnification algorithm/technique or any other known or to be known computational system or method that performs spatial decomposition and temporal filtering of a captured/recorded image(s), to identify subtle temporal or spatial motions or intervals or color changes from within the captured image.

Therefore, as a result of Step 412's detection of autonomous activity from the captured image, which includes the application of any known or to be known video magnification to the captured image, a determination is made as to the live-ness of the human representation in the captured image. Step 414. Process 410 can be applied to two-dimensional (2D) renderings and 3D models of a user's face.

According to some embodiments, as mentioned above, a user's pulse can be detected from the captured image. Here, Step 412 would include determining (i.e., amplifying) variations of the skin tone of the face represented in the captured image (e.g., minute variations). As discussed above, such amplification determination and detection can be performed by any known to be known amplification algorithm/technique, such as, but not limited to, Eulerian video magnification.

Based on the determination of the skin tone variations, Step 414 would involve a determination as to whether the facial representation is that of a human being. That is, a printout of a registered user's face (as an example to spoof the system) will not produce the same type of flashing colors that an actual person's face would show. Step 414 hereby involves detecting and measuring the amplified variations against a threshold, and should the threshold be satisfied, a determination is made that the captured image is that of a human being. In other words, should the variations be above a threshold associated with, for example, variations measured for a print out of a human face, the captured image is determined to be a digital representation of an actual human being, and not a spoof attempt.

According to some embodiments, Process 410 can also be applied for detecting blood circulation in a user's face. Here, Step 412 involves applying a known or to be known magnification algorithm/technique (as discussed above) to identify the circulation of blood in the user's face. This involves detecting color changes in the user's face by comparing differences in the color pigmentations between locations on the user's face (e.g., between user's cheeks, or at the chin and forehead, for example), for example, via a Eulerian video magnification technique. In some embodiments, the blood circulation detection of Step 412 can involve detecting motion of color changes from the captured image (e.g., differences in the image frames). Based on such detection of differences of color changes in the captured image, whereby the changes are compared to a threshold of color change, Process 410 can determine that different parts of the face change color at different times, thus allowing the verification of authenticity of the face. Step 414.

According to some embodiments, Process 410 can also detect subtle (and in some embodiments, involuntary) head movements of the user that are non-linear. Unlike a static printout, detected head movements from a sequence of video frames can evidence amplified, random motions using Process 410. Here, Step 412 involves analyzing a sequence of at least two frames for the image capture (e.g., recorded video) in order to detect motions of the depicted head against a threshold. Such motions can include, but are not limited to, head shaking and turning, which causes a frame-over-frame transformation of the user's face that is not linear. Therefore, a determination that the motions of a user's head during the image capture are non-linear results in the determination that the digital representation in the captured/recorded image is an actual human being, and not a spoof attempt.

FIG. 4C is a Process 420 diagram illustrating steps performed in accordance with embodiments of the present disclosure for implicitly (i.e., without a user's knowledge or attention being drawn to it) triggering a user for inadvertent responses, including, but not limited to, tracking the user's small eye movements (e.g., saccades) when displaying and moving objects on the screen. As discussed herein, Process 420 can involve performing the following non-limiting determinations: checking for reflections of the screen in the user's pupils, provoking squinting from the user by showing blurred images which can provoke such squinting, tracking micro-expressions from the user in order to identify signs of recognition in response to displaying random sequences of known and unknown people, displaying an avatar with random expressions and checking for reciprocal micro-expressions, producing loud sounds and detecting cringing, flashing or displaying bright light to detect changes in pupil dilation or change of expression in reaction to same, and the like. As discussed herein, in response to such triggers being presented to the user, the Process 420 can be implemented to determine the live-ness of the image being recorded/captured during and/or immediately in response to presentation of such triggers. Process 420 is performed by the implicit verification module 308 of the anti-spoofing engine 302.

Process 420 beings with Step 422 where content is output via the computing device that is subject to an authorization request from a user. According to some embodiments, the output content can include, but is not limited to, audio, video, an image, text, and/or some combination thereof. According to some embodiments, the content is generated and output in response to a request from a user to capture an image. In response to the output content, Step 424 involves tracking the user's response. That is, using the camera of the computing device, the user's response is tracked and analyzed. This enables the anti-spoofing engine 302 to compile the user's involuntary movements that occurred in response to the generated output. Based on the tracked user response, a determination is then made as to whether the response can be attributed to that of a human user, as opposed to a digital representation of a user used in connection with a spoofing attempt.

According to some embodiments, the present disclosure will discuss a few non-limiting examples to show how Process 420 can be successful in determining live-ness of a user. By way of a non-limiting example, Process 420 can involve tracking eye saccades. Human eyes perform fast movements of both eyes in the same direction to locate interesting parts in a visible scene or image, such as, for example another person's face. Saccades cannot be altered at will. Process 420, according to the disclosed systems and methods, can exploit visually guided saccades, or that the fact that the human eye involuntarily moves towards a visual stimulus, to verify a user's authenticity and live-ness. For example, Process 420 can involve displaying an object on the screen of the computing device (Step 422) and tracking the user's pupils in response to the displayed object (Step 424). If both eyes are determined to move (or "jump") into the direction of the displayed object, the implicit verification module 308 can determine that an actual person is sitting in front of the camera (Step 426).

In some embodiments, Steps 424-426 can determine the center of the screen's coordinates, and then determine the coordinates of both the displayed object and the movement of the saccades from the center of the screen (or other starting/default position on the screen). If the difference from the center of the screen (or other default location) for the displayed object and the saccades matches at least a threshold level, then the implicit verification module 308 can determine that an actual person is sitting in front of the camera.

According to embodiments of the present disclosure, object positions on the screen can be randomly selected in a non-predictable manner (according to a randomization algorithm). According to embodiments of the present disclosure, object animations can include, but are not limited to, showing an object, moving the object, flashing the object, and the like. According to some embodiments, Process 420 may be recursive for a predetermined number of iterations in order to satisfy a security threshold that ensures a user's eyes are performing in a manner consistent with a human being. Process 420's implementation of tracking eye saccades enables the prevention of replay attacks to face recognition, such as an attacker holding a mobile device up to the camera and playing back a recorded video of a registered user.

By way of another non-limiting example, Process 420 can involve checking for reflections in a user's eyes from the captured image. For example, a bright screen, a camera flash or display of a device can cause reflections in the user's eyes, which are visible to the camera. Therefore, for example, to verify that a person is in front of the camera (as opposed to a video playing on a screen), randomly flashing colors or an entire web page or screen with a certain pattern (Step 422) will produce the same pattern of reflections in the user's eyes. Here, the user's eyes can be located and temporal patterns of varying brightness intensities within the user's eyes can be detected/tracked (Step 424). In Step 426, the tracked reflections are compared to the pattern of the screen flashing, and if there is a match at or above a threshold, then the implicit verification module 308 can determine that an actual person is sitting in front of the camera. In some embodiments, Step 426 can involve determining if the reflection from the user's eyes is at a level of intensity that corresponds to the flashed object's brightness intensity. If so, then the implicit verification module 308 can determine that an actual person is sitting in front of the camera.

By way of another non-limiting example, Process 420 can involve displaying an out-of-focus text or picture(s) to provoke a user's involuntary response. For example, a natural reaction to out-of-focus images is a user squinting his/her eyes. For example, Process 420 can present a sequence of words or phrases on the authentication screen to the user, which can randomly be blurred (Step 422). Process 420 then detects eye blinking or squinting over a predetermined period of time for the duration that the text or images are blurred (Step 424). If the blinking/squinting matches the duration of the blurred imagery, at or above a threshold, then the implicit verification module 308 can determine that an actual person is sitting in front of the camera.

According to some embodiment, Process 420 can also provoke and detect micro-expressions in the user's face. Similar to saccades, micro-expressions are brief (¹⁄₂₅ to ¹⁄₁₅ of a second) involuntary motions in the user's face that can reflect the emotions the user experiences. To provoke those responses, Process 420 can trigger the user in various ways with the following non-limiting examples of images on the screen: a sequence of people that are known and unknown, whereby signs of recognition in the user's face can be tracked; an avatar face with random facial expressions (such as a smile, frown, laughter), whereby reciprocal signs of emotion can be tracked from the features of the user's face; images of scenes and/or people that provoke emotional reactions (such as anxiety, amusement, shame, disgust, anger), whereby the micro-expressions in the user's face in response to such imagery can be tracked.

By way of another non-limiting example, Process 420 can produce a loud and unexpected sound as the generated output (Step 422). Playing a loud, potentially shocking sound, possibly along with displaying a shocking image, will likely not just cause micro-expressions in the user, but also may make the user cringe and/or cause a head or body movement (e.g., rapid shake in the user's head, flinching, and the like) which will be visible in the camera image (Step 424) or detectable by motion sensors in the user's device. If such expressions and/or movements are present, Process 420 can track these reactions and determine if they occur during a threshold period associated with the generated sound/displayed image. In some embodiments, a user's movements, such as a reaction by the user to generated content can be determined and tracked using the computing device's accelerometer, such as the one in mobile devices.

FIG. 4D is a Process 430 diagram illustrating steps performed in accordance with embodiments of the present disclosure for explicitly (i.e., with a user's knowledge) triggering a user for a response that indicates that the image being captured/recorded of the user is an actual human being. By way of non-limiting example, the disclosed systems and methods can prompt the user to read out a dynamically generated phrase while performing lip recognition to determine if the lip movement matches the requested phrase. In another non-limiting example, the disclosed systems and methods can prompt a user to perform a series of randomized actions (e.g., turning the head), asking the user to follow, with their eyes, an object moving on the screen, and the like, whereby the detection of such movements is matched to the requested action to determine if the actions match the requested actions. Thus, Process 430 actively prompts the user for a reaction, which requires the user to explicitly act and verify his/her live-ness. Process 430 is performed by the explicit verification module 310 of the anti-spoofing engine 302.

Process 430 beings with Step 432 where a user is explicitly prompted with content output via the computing device that is subject to an authorization request from the user. According to some embodiments, the content included in the prompt of Step 432 can include, but is not limited to, audio, video, an image, text, and/or some combination thereof. In response to the prompt, Step 434 involves tracking the user's response. That is, using the camera of the computing device, the user's response is tracked and analyzed. This enables the anti-spoofing engine 302 to compile the user's involuntary movements that occurred immediately in response to the generated output. Based on the tracked user response, a determination is then made as to whether the response can be attributed to that of a human user, as opposed to a digital representation of a user used in connection with a spoofing attempt. Step 436.

According to some embodiments, the present disclosure will discuss a few non-limiting examples to show how Process 430 can be successful in determining live-ness of a user. By way of a non-limiting example, Process 430 can involve asking the user to read out text, whereby the user's lip movements will be tracked in order to determine if they correlate to the prompted text. For example, in Step 432 a user is prompted to read out dynamically generated content, for example, a phrase, a set of words, or numbers. In Step 434, the user's lip movements are tracked as the user reads out the text.

In some embodiments, Step 434 can involve determining that the user is reading the text via the microphone of the device recording the user's voice, and/or that the camera notices movements in the recorded image occurring. While such recording is occurring, the camera of the device can analyze the user's lip movements to verify that the motions match the displayed text. Thus, as in Step 436, the explicit verification module 310 can determine that an actual person is sitting in front of the camera when the user's lip movements measure up to, according to a threshold, movements matching that of a "default" user reading the same text (where a "default" user's lip movement corresponds to a predetermined or preset lip movement measurement). Such methodology can prevent static attacks (such as holding up the printout of a face to the camera) as well as replay attacks (such as a video playing on another device that is presented to the camera).

By way of another non-limiting example, Process 430 can involve prompting the user to perform a string of activities. The user can be prompted to perform activities in the camera image that can be detected and verified. By way of non-limiting example, such activities can include, but are not limited to, prompting the user to: tilt or turn the head left, right, up, down, or some combination thereof; raise eyebrows; produce facial expression (such as an angry or smiling face), move the user's device in relation to the user's face to capture and detect the sides of the user's head and face, and the like, or some combination thereof. Such activities can be detected, tracked and confirmed according to Process 430, as discussed herein.

By way of another non-limiting example, Process 430 can involve prompting the user to follow a moving object on the screen with their eyes. Here, Process 430 involves displaying and moving an object on the screen and asking the user to follow the object with his/her eyes. Step 432. For example, such object can be a displayed image that moves along a random path. In Steps 434-436, the user's eye movements are tracked and verified to confirm that they match the motion path of the object. Steps 434-436 are performed in a similar manner as Steps 424-426 discussed above.

FIG. 4E is a Process 440 diagram illustrating steps performed in accordance with embodiments of the present disclosure for correlating features extracted from a user-facing camera with features extracted from a back-facing camera on mobile devices. By way of a non-limiting example, the disclosed systems and methods can perform a matching of the pulse rate detected in the user's face with the pulse rate detected from the user's finger when placed on the back-facing camera of a mobile device. Process 440 is performed by the correlation verification module 312 of the anti-spoofing engine 302.

Process 440 beings with Step 442 where a user provides at least two inputs to the device. For example, such inputs can include, but are not limited to, the image capture discussed above, fingerprint scanning, iris scanning, and the like. Thus, Step 442 involves receiving at least two biometric inputs for a user. According to some embodiments, Step 442 can further involve prompting the user for at least one of the inputs.

In Step 444, the input values from each input are compared with each other. Based on such comparison, a determination is made regarding the live-ness of the user providing the inputs. Step 446. That is, Steps 444-446, according to some embodiments, can comprise normalizing the inputs from each biometric reading, and comparing each reading to determine if they correlate to one another. Should they be determined to correlate at or above a threshold, then the user's live-ness is confirmed.

By way of a non-limiting example, Process 440 can involve using a front-facing camera on a mobile device to detect the user's pulse, as discussed above in relation to FIG. 4B; and simultaneously, prompting the user to press a finger against the back-facing camera and cover the flash light thereby enabling the detection of the finger's pulse. Step 442. Then, in Step 444, the pulse patterns and/or frequencies of each input are compared to verify that the identified user in the camera image has the same pulse (or similar pulse according to a comparison threshold) as the user with the finger on the camera.

According to some embodiments, a salient frequency in the color changes in the user's face, as in FIG. 4B can be detected, which represent the user's pulse. Using this information, the correlation verification module 312 can analyze the finger's pulse to determine if any spikes or other frequency values correspond to the detected salient frequency determined from the user's face. If there is a correspondence of the frequencies at or above a threshold, then the correlation verification module 312 can verify the live-ness of the user. Thus, Process 440 can include a plurality of approaches which can prevent video spoofing attacks because an attacker would have to reproduce the user's pulse at least twice.

According to some embodiments, Processes 410-440 may further include the implementation of any known or to be known edge detection algorithm. Such implementation could remedy a situation where an attacker cuts out his/her eyes from a victim's photo to simulate the responses in eye motion and flashes a light at the sheet of paper to simulate the pulse. Using an edge detection algorithm would result in the cutouts yielding a sharp, unnatural edge. This would enable each process to identify spikes in the detected pulse for comparison with edges in the troughs of the pulse. Thus, if the strong edges are not detected in the comparison, a determination can be made that such attempt is a spoofing attempt.

According to some embodiments of the present disclosure, Step 404 of FIG. 4A can be performed by the combination module 314 of the anti-spoofing engine 302. According to such embodiments, the determination of a user's live-ness can be based on any combination of at least two of Processes 410-440, where the combination module 314 can trigger performance of any of the other modules in the anti-spoofing engine 302.

According to some embodiments, the disclosed systems and methods (e.g., execution of the anti-spoofing engine 302) can be implemented entirely on the server side, allowing a client platform to access the anti-spoofing platform discussed herein via a mobile application, personal computer, a web-based application, and the like, or simply using a web page using, for example, HTML5 Media Capture. According to some embodiments, the disclosed systems and methods can be performed entirely on the client side, by the client device and/or a client application. According to some embodiments, the disclosed systems and methods can be performed via a combination of steps performed by a server, client device and/or client application.

As shown in FIG. 5, internal architecture 500 of a computing device(s), computing system, computing platform and the like includes one or more processing units, processors, or processing cores, (also referred to herein as CPUs) 512, which interface with at least one computer bus 502. Also interfacing with computer bus 502 are computer-readable medium, or media, 506, network interface 514, memory 504, e.g., random access memory (RAM), run-time transient memory, read only memory (ROM), media disk drive interface 520 as an interface for a drive that can read and/or write to media including removable media such as floppy, CD-ROM, DVD, media, display interface 510 as interface for a monitor or other display device, keyboard interface 516 as interface for a keyboard, pointing device interface 518 as an interface for a mouse or other pointing device, and miscellaneous other interfaces not shown individually, such as parallel and serial port interfaces and a universal serial bus (USB) interface.

Memory 504 interfaces with computer bus 502 so as to provide information stored in memory 504 to CPU 512 during execution of software programs such as an operating system, application programs, device drivers, and software modules that comprise program code, and/or computer executable process steps, incorporating functionality described herein, e.g., one or more of process flows described herein. CPU 512 first loads computer executable process steps from storage, e.g., memory 504, computer readable storage medium/media 506, removable media drive, and/or other storage device. CPU 512 can then execute the stored process steps in order to execute the loaded computer-executable process steps. Stored data, e.g., data stored by a storage device, can be accessed by CPU 512 during the execution of computer-executable process steps.

Persistent storage, e.g., medium/media 506, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 528 typically provides information communication using transmission media through one or more networks to other devices that use or process the information. For example, network link 528 may provide a connection through local network 524 to a host computer 526 or to equipment operated by a Network or Internet Service Provider (ISP) 530. ISP equipment in turn provides data communication services through the public, worldwide packet-switching communication network of networks now commonly referred to as the Internet 532.

A computer called a server host 534 connected to the Internet 532 hosts a process that provides a service in response to information received over the Internet 532. For example, server host 534 hosts a process that provides information representing video data for presentation at display 510. It is contemplated that the components of system 500 can be deployed in various configurations within other computer systems, e.g., host and server.

At least some embodiments of the present disclosure are related to the use of computer system 500 for implementing some or all of the techniques described herein. According to one embodiment, those techniques are performed by computer system 500 in response to processing unit 512 executing one or more sequences of one or more processor instructions contained in memory 504. Such instructions, also called computer instructions, software and program code, may be read into memory 504 from another computer-readable medium 506 such as storage device or network link. Execution of the sequences of instructions contained in memory 504 causes processing unit 512 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 500. Computer system 500 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 502 as it is received, or may be stored in memory 504 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
    capturing, via a user-facing camera of a computing device, a representation of a user, said representation comprising a rendering of a face of the user;
    capturing, via a back-facing camera of the computing device, biometric input of the user;
    parsing, via the computing device, said captured representation to identify facial features of the user;
    determining, via the computing device and based on said parsing, first information associated with a human being based on the identified facial features;
    parsing, via the computing device, said biometric input of the user;
    determining, via the computing device, second information associated with a human being based on the parsed biometric input;
    normalizing, via the computing device, the first information and the second information;
    analyzing, via the computing device, the normalized first and second information, and based on said analysis, determining whether biometric values of the second information correspond to biometric values of the first information;
    determining, via the computing device, a live-ness of the user based on said biometric value determination, said live-ness indicating whether the representation is of a human being and not a non-human representation of a human-being; and
    enabling, via the computing device, facial recognition authentication of the user based on said live-ness determination, said enabling comprising executing said facial recognition authentication when said live-ness indicates the captured representation is of a human being, said enabling further comprising denying execution of said facial recognition authentication when said live-ness indicates the captured representation is a non-human representation.

2. The method of claim 1, further comprising:
    analyzing said captured representation to identify an activity associated with at least one of said facial features; and
    identifying variations in at least one of said facial features as performing an autonomous activity.

3. The method of claim 2, further comprising:
    determining a pulse from the captured image by amplifying said identified variations, wherein said pulse determination triggers said live-ness determination.

4. The method of claim 2, further comprising:
    detecting temporal color changes in the user's face based on said identified variations; and
    determining blood circulation from said captured image based on said detected color changes, wherein said blood circulation determination triggers said live-ness determination.

5. The method of claim 2, wherein said activity is identified and analyzed via a magnification algorithm being applied to the captured image.

6. The method of claim 1, further comprising:
    analyzing said facial features to identify movements of at least one of said facial features; and
    detecting non-linear movements of said at least one of said facial features, wherein said non-linear movement detection triggers said live-ness determination.

7. The method of claim 1, further comprising:
    generating an output to be rendered to the user, said output comprising information indicating a predetermined user response to the output;
    tracking a response by the user to said output; and
    determining said live-ness of the user based on said user response, said determination comprising comparing said predetermined user response to said user response, wherein said comparison satisfying a threshold triggers said live-ness determination.

8. The method of claim 7, wherein said output comprises content that triggers said user response to be involuntary.

9. The method of claim 7, wherein said generating the output comprises prompting the user with said output, said prompt comprising requesting said user to respond to said output.

10. The method of claim 7, wherein said output comprises content selected from a group consisting of: audio, video, an image, text, and some combination thereof.

11. The method of claim 3, further comprising:
    receiving an input from the user, said input comprising a second pulse reading derived from a finger of the user being placed a camera of the computing device;
    comparing a pulse pattern of the pulse determined from the captured image and a pulse pattern of the second pulse; and
    determining said live-ness of the user based on said comparison, wherein said comparison satisfying a threshold triggers said live-ness determination.

12. The method of claim 1, wherein said captured representation of the user is an image.

13. The method of claim 1, wherein said captured representation of the user is a video.

14. The method of claim 1, wherein said information comprises biometric information related to at least one of the user's retina and the user's face.

15. A non-transitory computer-readable storage medium tangibly encoded with computer-executable instructions, that when executed by a processor associated with a computing device, performs a method comprising:
    capturing, via a user-facing camera of the computing device, a representation of a user, said representation comprising a rendering of a face of the user;
    capturing, via a back-facing camera of the computing device, biometric input of the user;
    parsing, via the computing device, said captured representation to identify facial features of the user;
    determining, via the computing device and based on said parsing, first information associated with a human being based on the identified facial features;
    parsing, via the computing device, said biometric input of the user;

determining, via the computing device, second information associated with a human being based on the parsed biometric input;

normalizing, via the computing device, the first information and the second information;

analyzing, via the computing device, the normalized first and second information, and based on said analysis, determining whether biometric values of the second information correspond to biometric values of the first information;

determining, via the computing device, a live-ness of the user based on said biometric value determination, said live-ness indicating whether the representation is of a human being and not a non-human representation of a human-being; and enabling, via the computing device, facial recognition authentication of the user based on said live-ness determination, said enabling comprising executing said facial recognition authentication when said live-ness indicated the captured representation is of a human being, said enabling further comprising denying execution of said facial recognition authentication when said live-ness indicates the captured representation is a non-human representation.

16. The non-transitory computer-readable storage medium of claim 15, further comprising:

analyzing said captured representation to identify an activity associated with at least one of said facial features; and identifying variations in at least one of said facial features as performing an autonomous activity, wherein said identified autonomous activity triggers said live-ness determination.

17. The non-transitory computer-readable storage medium of claim 15, further comprising:

generating an output to be rendered to the user, said output comprising information indicating a predetermined user response to the output;

tracking a response by the user to said output; and determining said live-ness of the user based on said user response, said determination comprising comparing said predetermined user response to said user response, wherein said comparison satisfying a threshold triggers said live-ness determination.

18. A computing device comprising:

a processor;

a non-transitory computer-readable storage medium for tangibly storing thereon program logic for execution by the processor, the program logic comprising:

logic executed by the processor for capturing, via a user-facing camera of the computing device, a representation of a user, said representation comprising a rendering of a face of the user;

logic executed by the processor for capturing, via a back-facing camera of the computing device, biometric input of the user;

logic executed by the processor for parsing, via the computing device, said captured representation to identify facial features of the user;

logic executed by the processor for determining, via the computing device and based on said parsing, first information associated with a human being based on the identified facial features;

logic executed by the processor for parsing, via the computing device, said biometric input of the user;

logic executed by the processor for determining, via the computing device, second information associated with a human being based on the parsed biometric input;

logic executed by the processor for normalizing, via the computing device, the first information and the second information;

logic executed by the processor for analyzing, via the computing device, the normalized first and second information, and based on said analysis, determining whether biometric values of the second information correspond to biometric values of the first information;

logic executed by the processor for determining, via the computing device, a live-ness of the user based on said biometric value determination, said live-ness indicating whether the representation is of a human being and not a non-human representation of a human-being; and logic executed by the processor for enabling, via the computing device, facial recognition authentication of the user based on said live-ness determination, said enabling comprising executing said facial recognition authentication when said live-ness indicates the captured representation is of a human being, said enabling further comprising denying execution of said facial recognition authentication when said live-ness indicates the captured representation is a non-human representation.

19. The computing device of claim 18, further comprising:

logic executed by the processor for analyzing said captured representation to identify an activity associated with at least one of said facial features; and logic executed by the processor for identifying variations in at least one of said facial features as performing an autonomous activity, wherein said identified autonomous activity triggers said live-ness determination.

20. The computing device of claim 18, further comprising:

logic executed by the processor for generating an output to be rendered to the user, said output comprising information indicating a predetermined user response to the output;

logic executed by the processor for tracking a response by the user to said output; and logic executed by the processor for determining said live-ness of the user based on said user response, said determination comprising comparing said predetermined user response to said user response, wherein said comparison satisfying a threshold triggers said live-ness determination.

* * * * *